United States Patent [19]
Deubel et al.

[11] 3,781,169
[45] Dec. 25, 1973

[54] DISPERSING AND STABILIZING AGENTS FOR DYESTUFFS

[75] Inventors: Reinhold Deubel, Altenhain; Helmut Diery, Kelkheim, both of Germany; Wolfgang Klinner, Sao Paolo, Brazil; Karl-Hermann List, Frankfurt; Heinz Uhrig, Steinbach, both of Germany

[73] Assignee: Farbwerke Hoechst Aktiengesellschaft vormals Meister Lucius & Bruning, Frankfurt am Main, Germany

[22] Filed: July 1, 1971

[21] Appl. No.: 159,065

[30] Foreign Application Priority Data
July 3, 1970 Germany.................. P 20 32 926.4

[52] U.S. Cl............................... 8/34, 8/169, 8/173, 8/89
[51] Int. Cl. ........................ D06p 1/22, C09b 67/00
[58] Field of Search.................... 8/173, 89

[56] References Cited
UNITED STATES PATENTS
2,320,678  6/1943  Tassel .................................. 260/49

Primary Examiner—Donald Levy
Attorney—Curtis, Morris & Safford

[57] ABSTRACT

Dispersions of pigments, disperse- or vat-dyestuffs, wherein the dispersing agent is formed either by co-condensation of a phenolic component, formaldehyde and an alkali metal sulfite or of a sulfonated phenolic component and formaldehyde. These dispersions are characterized in that the dispersing agent used shows an improved dispersing effect. Furthermore, they can also be used when being neutralized for the dispersing alkali sensitive dyestuffs and they show no tendency to soil the fabrics so that also clean shades may be dyed.

2 Claims, No Drawings

DISPERSING AND STABILIZING AGENTS FOR DYESTUFFS

The present invention relates to dispersing and stabilizing agents for dyestuffs.

The use of new dyeing processes in the last years has resulted in considerably higher requirements as to the finish of textile dyestuffs, in particular of disperse dyestuffs for synthetic fibers. The dispersion grade and stability of the dispersions must be of a particularly high quality in the dyeing of wound packages. Alternatively, the efficiency of the dispersing agents used until now is limited to several products as the individual dyestuffs have, in general, considerably different properties, in particular as to their grain size or their solubility, for example, in water. For example, lignin sulfonates do not produce a sufficient thermal stability of the dispersions. Other dispersing agents are only effective in the alkaline range and impart a peculiar tint to the fibers so that it is difficult to dye clear shades. Furthermore, a great number of dispersing agents have an adverse effect on the dispersing and dyeing processes because they tend to foaming.

A useful dispersing agent often used for the dyestuff dispersion is the condensation product of cresol, 2-napthol-6-sulfonic acid sodium sulfite and formaldehyde (FIAT Report 1013) which, however, can not meet all the requirements to be fulfilled by the dispersions.

The present invention provides the use of phenolformaldehyde condensation products containing sulfo groups as dispersing agents for the fine division of dyestuffs, such as organic or inorganic pigments, vat dyestuffs and especially disperse dyestuffs and other insoluble or sparingly soluble dyestuffs, the condensation products being prepared from mononuclear phenols containing sulfo groups and/or from binuclear uncondensed mono- or bifunctional phenols containing sulfo groups and formaldehyde or from corresponding phenols free from sulfo groups, formaldehyde and sulfite.

This invention comprises using condensation products which have a molar ratio of the phenolic component to formaldeyhde of about 1 : 1.1 to 1 : 4, preferably from 1 : 1.2 to 1 : 3.

The condensation products to be used in accordance with the invention are obtained by the known reaction of the phenolic component with formaldehyde and sodium sulfite or sodium bisulfite in the alkaline range or by the reaction of the phenolic component containing sulfo groups in the nucleus with formaldehyde. Instead of formaldehyde and sodium sulfite the sodium salt of hydroxy-methane-sulfonic acid may also be used.

Suitable mononuclear phenols are, for example, phenol, o-cresol, m-cresol or technical-grade cresol mixtures, o-chlorophenol, o-sec.butylphenol, o-tert.-butylphenol and xylenols.

Alkyl phenols, the alkyl groups of which contain less than four carbon atoms in total, are preferably used. The phenolic components may be used in pure form, in technical-grade mixtures or in the mixture of different individual components.

As an example of a mixture of different individual components there may be mentioned the advantageous use of 3 to 30 percent by weight of phenols substituted by alkyl or aryl groups, for example, p-tert.-butyl-phenol, nonyl-phenol, dodecyl-phenol, o-phenyl-phenol, 1-phenyl-1-(hydroxy-phenyl)-ethane (prepared from phenol and styrene) in admixture with, for example, cresols or chlorophenols in the condensation reaction mixture, furthermore the use of binuclear, uncondensed phenols, for example, 4,4'-dihydroxy-diphenyl-methane, 4,4'-dihydroxy-diphenyl propane, 4,4'-dihydroxy-diphenyl-sulfone and 2,2'- and 4,4'-dihydroxy-diphenyl.

The process of preparation on the basis of sodium sulfite is preferably used. The amount of sodium sulfite used is preferably within the range of from 0.3 to 1.6 mols per 1 mol of the phenolic components. As nucleus-sulfonated phenols there may be used, for example, o-phenol sulfonic acid, phenol sulfonic acid mixtures, cresol sulfonic acid and others. The nucleus-sulfonated phenols may be condensed alone with formaldehyde or in admixture with the phenols mentioned above or in admixture with phenols, formaldehyde and sodium sulfite.

The condensation period may be 2 to 15 hours; however, products of good efficiency are in general obtained with a reaction period of from 4 to 11 hours at a temperature within the range of from 90° to 110°C. For acceleration, the reaction may be carried out in a pressure vessel at 120°C. If desired, the products may be converted into solid form by vaporization in vacuo or by calender or spray-drying.

To obtain the disperse dyestuff in powder or paste form the following method is used: The dyestuff in form of its press cake or in special cases, also in dry form is stirred by means of a dissolver together with the dispersing agents with an amount of water as small as possible to yield a suspension which can be pumped, if necessary, passed over a corundum disk mill or similar colloid mills to be homogenized and then, generally ground in a continuous mixer mill with quarzite beads of from 1 to 3 mm diameter in several passages until the fine dispersion is obtained. After grinding, it is possible, in the same manner as in the stirring process, to add, furthermore, bactericides, extenders, for example, sugar, further dispersing agents and water to obtain the final paste form. To obtain powder form, a suitable paste is dried in a spray tower and subsequently its standard type is adjusted in dry manner.

For preparing a dyestuff dispersion generally 0.2 to 3 parts by weight of the dispersing agent are used for one part of the dyestuff. The use of 0.5 to 2 parts of the dispersing agent is preferred.

The dispersing agents of the invention are very suitable for the dispersion of dyestuffs and are distinguished in comparison to the condensation product described in the FIAT-Final Report 1013 which contains as phenolic component, besides cresol, 2-naphthol-6-sulfonic acid and which loses its dispersing properties when neutralized by a substantially improved dispersing effect, this effect being such that small amounts are sufficient to obtain stable dispersions.

As dyestuffs which may be dispersed according to this invention disperse dyestuffs, vat dyestuffs and pigments may be used which are enumerated under these headings in Volumes 1 and 2 of "Colour Index" and in subsequent authorized amendments thereto.

With regard to the sensibility of several dyestuffs and fibers in an alkaline medium, the dispersing agents of the invention have the further considerable advantage that the strongly alkaline condensation products can be neutralized with acids, for example, sulfuric acid, without the loss of the valuable dispersing properties.

With the use of these dispersing agents thus neutralized, also those dyestuffs which are sensitive to the influence of a base can be dispersed. Dispersions prepared from these neutral dispersing agents can also be combined with other soluble dyestuffs sensitive to the influence of a base for example, the vinyl sulfonic acid and sulfonic acid ester dyestuffs.

The condensation products thus obtained have the further advantage that their tendency of foaming which may considerably affect the dispersing process, is reduced. They also have a reduced tendency to dye textiles alone.

The following Examples illustrate the invention without limiting them thereto. These examples show the superiority of these compounds with regard to their dispersing capacity, their properties to improve the stability of the dispersions and the reduced soiling of the fiber. The comparative product A mentioned hereafter was prepared according to the process described in the FIAT Final Report 1013 from cresol, 2-naphthol-6-sulfonic acid, sodium sulfite and formaldehyde The parts indicated in the Examples are by weight, unless stated otherwise. To characterize the dispersing capacity the following processes have been used:

Test 1

A 0.2% solution of the leucotetrasulfuric acid ester salt of the 3,3''-dichloroindanthrene-azine is decomposed with sulfuric acid and sodium nitrite while stirring thoroughly so that the insoluble dyestuff precipitates. In the presence of amounts of the dispersing agents to be tested which increase from test to test, the dyestuff is dispersed to a relatively good degree. The amount required may be easily evaluated by means of flow samples (1 ml of the dispersion was allowed to flow on a filter-paper) or under the microscope and may be compared with other dispersing agents. If the dispersions are allowed to stand especially at elevated temperature and if they are controlled again, after a prolonged time, the stability properties of the dispersing agents can be recognized.

This testing method is carried out at a pH of from 1 to 2.

Test 2

A corresponding test of the dispersing agents in the alkaline range at a pH of from 11 to 12 is carried out by saponification of the dyestuff indicated in British Pat. No. 998,917, Example 4, the coupling component of 2-bromo-aniline-4-$\beta$- hydroxyethyl sulfone sulfuric acid ester on diphenyl amine.

Test 3

At the neutral pH of 6 to 7 the dispersing effect may be examined by coupling the diazonium salt of the 2-methyl-5-chloro-aniline on $\beta$-hydroxynaphtoic acid-2-methyl-anilide also in the presence of different amounts of dispersing agents. Hereinafter the ratio of dyestuff to dispersing agents is indicated at which a complete dispersion of the dyestuff, i.e., a complete outflow on the filter sample, is obtained. The same is true in the case of storing samples, the ratio of the components therein does not change if they are stable and, if they are not stable, the ratio is shifted towards larger amounts of dispersing agent.

Test 4

To carry out comparative grinding tests, about 4 grams of a dyestuff are ground with the dispersing agent to be tested, with water and 50 g of siliquartzite beads of 1 mm diameter by means of a two-disk-stirrer similar to the common stirrers in mixer mills in a little cylinder with a laboratory stirring motor, while cooling. The proceeding fine dispersion is observed at regular intervals by means of flowout filter samples and microscopic examination and evaluated in a five-point scheme (1 = very poor, 5 = very good). The storing stability can be evaluated after dilution of the samples to yield the desired dyestuff concentration, storing of the samples in the drying cabinet at 50° and re-examination of the dispersion by the flow-out method on a filter paper after a storing period of, for example, 1, 3 and 6 weeks.

Test 5

In addition to these comparative test methods the dyestuffs were finely dispersed on a bead-mill in known manner and their dyeing properties were examined with regard to the tinctorial strength and the stability properties of the dispersions under dyeing conditions.

EXAMPLE 1

159 Parts of a technical-grade cresol fraction which contained a proportion of about 40 percent m-cresol, were condensed with 209 parts of crystallized sodium sulfite, 200 parts of 30 percent formaldehyde and 241 parts of water at a temperature of 100° for 11 hours while stirring. After the reaction, the solution was diluted at 80° with 115 parts of water and showed good dispersion properties not only in the alkaline range but also after neutralization with sulfuric acid.

In Test 1, 1 part of this dispersing agent was required for 1 part of dyestuff to obtain a good dispersion, while 1.5 part was required of the comparative product. When dispersing 1,4-diamino-2-bromo-6-nitro-anthraquinone (hereinafter called dyestuff B) each with 0.6 part of a dispersing agent on 1 part of dyestuff under the conditions of Test 4, a good dispersion was obtained with the comparitive product A after about 3 hours, while the dispersing agent herein prepared yielded a fine dispersion already after 1.5 hour.

The dyestuff dispersions of dyestuff B tested according to Test 5 were satisfactory as to their color.

EXAMPLE 2

159 Parts of a technical-grade cresol fraction with a content of 40 percent m-cresol were condensed with 209 parts of crystallized sodium sulfite, 200 parts of 30 percent formaldehyde and 241 parts of water at a temperature of 120°C within 6 hours while stirring. The solution was diluted after the reaction with 116 parts of water at 80°C and was used at a pH value of about 10 in the following comparative tests. In the first three tests the following amounts were necessary finely to disperse 1 part of dyestuff:

|  | Test | | |
|---|---|---|---|
|  | 1 | 2 | 3 |
| Dispersing agent of | | | |
| Example 2 | 1 | 1.5 | 0.25 |
| Comparative product A | 1.5 | very poor even with 2 parts. | 0.5 |

In the grinding Test 4 hardly 1 hour was necessary to disperse 1 part of dyestuff B (Example 1) with 0.6 part of the dispersing agent prepared as described above. When comparative product A was used still some undispersed particles were found on the flow-out sample which disappeared only after a very long grinding period.

EXAMPLE 3

With the dispersing agent prepared according to Example 2 the disperse dyestuff (dyestuff C) which is obtained by coupling diazotized 2-chloro-4-nitroaniline with N-ethyl-N(β-cyanoethyl)aniline was ground within 6.5 hours in a ratio of 1 : 0.6 to yield a stable good dispersion while a still unsatisfactory dispersion was obtained with comparative product A even in a ratio of 1 : 1.3. Both dispersions were stable on storing. When comparative product A was ground in the smaller ratio of 1 : 0.6 a dispersion was obtained which was not stable on storing.

EXAMPLE 4

A mixture of 302 parts of technical-grade cresol fraction with a content of 40 percent of m-cresol, 16 parts of nonyl-phenol, 528 parts of crystallized sodium sulfite and 500 parts of 30 percent formaldehyde in 300 parts of water was reacted for 6 hours at a temperature of 102° to 105°C. Subsequently the reaction mixture was cooled to 80°C and diluted with 645 parts of water.

This aqueous solution for itself or after spray-drying is a good dispersion agent. To carry out the first three tests the following amounts of the dispersing agent were necessary to disperse 1 part of dyestuff.

|  | Test | | |
|---|---|---|---|
|  | 1 | 2 | 3 |
| Dispersing agent of the Example | 1.5 | 1 | 0.025 |
| Comparative product | 2 | 2 | 0.4 |

In a grinding test according to Test 4, about 1 hour was necessary to obtain a good dispersion of dyestuff B (Example 1) with a ratio of dyestuff to dispersing agent of 1 : 0.6. With the dyestuff described in the German Pat. Nos. 1,150,477 and 1,162,961 which is dioxy-amino-(hydroxy-methyl)-aminoantraquinone, (dyestuff D) a grinding period of 4 hours was necessary. Using comparative product A, 6 hours however were necessary with this dyestuff.

EXAMPLE 5

When neutralizing with sulfuric acid the condensation product prepared according to Example 4 after the dilution step, a dispersing agent was obtained the following amounts of which were necessary finely to disperse 1 part of dyestuff in the first three test methods.

|  | Test | | |
|---|---|---|---|
|  | 1 | 2 | 3 |
| Dispersing agent of the Example | 1.5 | no dispersion | 0.125 |
| Comparative product A | 2 | no dispersion | 0.4 |

It was even better than the comparative alkaline product A. When being neutralized the comparative product A lost its dispersing properties almost completely.

According to Test 4, 6 hours were necessary for the fine dispersion of dyestuff D (Example 4, the same time being needed with the alkaline comparative product. However, the product according to the above Example had the advantage that it could also be used for the dispersion of dyestuffs sensitive to alkalis.

EXAMPLE 6

The condensation product obtained from 120 parts of a technical-grade cresol fraction having a content of 40 percent of m-cresol, 200 parts of crystallized sodium sulfite, 300 parts of 30 percent formaldehyde and 200 parts of water at 100°C in an autoclave during 11 hours was diluted with further 85 parts of water after cooling to 80°C and could be used in this aqueous form or after drying in a spray tower as suitable dispersing agent for dyestuffs. According to Test 4, a good dispersion of dyestuff B (Example 1) was already obtained after 1 hour while comparative product A required 3 hours.

EXAMPLE 7

The condensation product obtained after a reaction period of 4 hours up to 120°C from 159 parts of a technical-grade cresol fraction having a content of 40 percent of m-cresol, 209 parts of crystallized sodium sulfite, 200 parts of 30 percent formaldehyde and 241 parts of water and which was diluted with 116 parts of water at 80°C was adjusted at a pH of 7 with sulfuric acid. Like the solution which is not neutralized, it is a suitable dispersing agent for the dispersion of dyestuffs. According to test 4 with dyestuff D (Example 4) a very good dispersion was already obtained after 5 hours with this neutral dispersing agent, while with comparative product A 6 hours were needed.

To grind the dyestuff E obtained by coupling of p-phenylene-diamine with phenol which is described in German Pat. No. 1,154,433, about 1.5 hour was necessary using the product of this Example in a ratio of the dyestuff to the dispersing agent of 1 : 0.6. Using the alkaline comparative product A unsatisfactory dispersion could be obtained after 2 hours. The use of the alkaline comparative product A can, however, not be recommended as it forms with dyestuff D an alkali metal salt of red shade which leads to a change in the shade of the dyeings.

The following test displays a further suitable property of the dispersing agents prepared according to the invention. When dyeing, for example, 10 g of a wool (80/80) or 10 g of a polyester (52/20) fabric in a usual dyeing bath (4 g/l of a commerical carrier, 4 g/l of ammonium sulfate and acetic acid to adjust the pH to about 5, about 0.8 g/l of a dispersing agent at a goods-to-liquor ratio of 1 : 25), but without any dyestuff, the soiling of the fabrics caused by the dispersing agents can be seen. The following Table shows the soiling data of wool and polyester fabrics.

|  | Comparative substance | | Substance of Example | |
|---|---|---|---|---|
|  | A | 2 | 7(pH 11) | 7( pH 7) |
| polyester | weak | in traces | in traces | nothing |
| wool | very heavy | less | less | in traces |

EXAMPLE 8

A condensation product obtained at 102° to 105°C after stirring for 11 hours from 120 parts of 2,2'-dihydroxy-diphenyl, 264 parts of crystallized sodium sulfite and 200 parts of 30 percent formaldehyde in 155 parts of water gives a good dispersing agent to disperse dyestuffs after dilution with 100 parts of water at 80°C, neutralization with sulfuric acid and subsequent spray-drying. According to testing methods 1 and 2 good dispersions are obtained at a ratio of 1 : 1.

EXAMPLE 9

A mixture of 186 parts of water, 269 parts of crystallized sodium sulfite, 29 parts of a technical-grade xylenol mixture and 127 parts of a technical-grade cresol mixture and 200 parts of a 30 percent formaldehyde were stirred at 102° - 105°C for 11 hours. After the addition of 140 parts of water at 80°C a good dispersing agent for dyestuffs was obtained. According to testing method 1, a good dispersion was obtained at a ratio of 1 : 1. Also in the alkaline range according to test 2 the product is very useful at this ratio.

The same good results were obtained when the portion of xylenol to cresol was increased at 1 : 3 in the condensation.

EXAMPLE 10

189 Parts of o-chlorophenol, 132 parts of sodium sulfite and 200 parts of 30 percent formaldehyde were stirred in 150 parts of water for condensation for 11 hours at 102° to 105°C and neutralized with sulfuric acid after dilution with 282 parts of water at 80°C. The aqueous solution is a good dispersing agent for dyestuffs.

We claim:

1. A dyestuff dispersion consisting essentially of: (a) 1 part by weight of a disperse- or vat-dyestuff; and (b) 0.2 to 3 parts by weight of a dispersing agent formed by co-condensation of 1 mol of a phenolic component, 1.1 to 4 mols of formaldehyde and 0.3 to 1.6 mols of alkali metal sulfite, said phenolic component being selected from the group consisting of

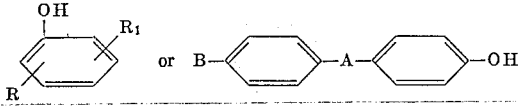

wherein R is hydrogen, chlorine or lower alkyl, $R_1$ is hydrogen, alkyl with one to 12 carbon atoms, B is hydrogen or hydroxyl and A is a single bond, sulfonyl or alkylene with one to four carbon atoms.

2. A dyestuff dispersion as claimed in claim 1 wherein the dispersing agent is formed by co-condensation of 1 mol of a phenolic component, 1.2 to 3 mols of formaldehyde and 0.3 to 1.6 mols of sodium sulfite.

* * * * *